(12) United States Patent
Cheng et al.

(10) Patent No.: US 9,558,391 B2
(45) Date of Patent: Jan. 31, 2017

(54) IDENTIFICATION RECOGNITION DEVICE AND METHOD OF OPERATING AN IDENTIFICATION RECOGNITION DEVICE

(71) Applicant: AU Optronics Corp., Hsin-Chu (TW)

(72) Inventors: Chih-Lun Cheng, Hsin-Chu (TW); Yu-Jung Liu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 261 days.

(21) Appl. No.: 14/553,946

(22) Filed: Nov. 25, 2014

(65) Prior Publication Data
US 2016/0019409 A1    Jan. 21, 2016

(30) Foreign Application Priority Data

Jul. 21, 2014    (CN) .......................... 2014 1 0347211

(51) Int. Cl.
H04N 7/18    (2006.01)
G06K 9/00    (2006.01)

(52) U.S. Cl.
CPC .............. G06K 9/0004 (2013.01); H04N 7/18 (2013.01)

(58) Field of Classification Search
CPC .................................................. G06K 9/0004
USPC ............................................................ 348/77
See application file for complete search history.

(56) References Cited

U.S. PATENT DOCUMENTS 6,011,860 A * 1/2000 Fujieda ................ A61B 5/1172
                                                    382/124
7,461,264 B2   12/2008 Chen
2007/0074913 A1 * 4/2007 Geaghan ................ G06F 3/044
                                                    178/18.06
2008/0122792 A1   5/2008 Izadi
2008/0303022 A1   12/2008 Tai
2013/0127748 A1   5/2013 Vertegaal
2013/0314148 A1   11/2013 Kang et al.
2013/0337976 A1   12/2013 Yanev
(Continued)

FOREIGN PATENT DOCUMENTS

CN    101359369 A    2/2009
CN    102512178 A    6/2012
(Continued)

OTHER PUBLICATIONS

Intellectual Property Office, Ministry of Economic Affairs, R.O.C., "Office Action", Jun. 27, 2016, Taiwan.

Primary Examiner — Behrooz Senfi
(74) Attorney, Agent, or Firm — Locke Lord LLP; Tim Tingkang Xia, Esq.

(57) ABSTRACT

An identification recognition device includes a light emission module, a light sensing module, a pulse scanning unit, a fingerprint scanning unit and a controller. The light sensing module is used to generate first light currents and second light currents according to first reflecting light and second reflecting light. The pulse scanning unit is used to generate data of current variance of the object and the fingerprint scanning unit is used to generate features of fingerprint of the object. The controller is used to control the light emission module to emit the first incident light and to emit the second incident light when the object has a pulse according to the data of current variance of the object, and determine if the object passes the identification recognition test according to the features of fingerprint of the object.

12 Claims, 6 Drawing Sheets

(56) References Cited

U.S. PATENT DOCUMENTS

2014/0219521 A1* 8/2014 Schmitt ............... G06K 9/0002
                                                                   382/124
2015/0245095 A1* 8/2015 Gonzalez ........... H04N 21/4542
                                                                   725/28

FOREIGN PATENT DOCUMENTS

| | | |
|---|---|---|
| CN | 103400069 A | 11/2013 |
| CN | 103455787 A | 12/2013 |
| EP | 2413129 | 2/2012 |
| TW | I283524 | 7/2007 |
| TW | 200849575 | 12/2008 |
| TW | 201035883 | 10/2010 |
| TW | 201101196 | 1/2011 |
| TW | 201101196 A | 1/2011 |

* cited by examiner

IDENTIFICATION RECOGNITION DEVICE AND METHOD OF OPERATING AN IDENTIFICATION RECOGNITION DEVICE

BACKGROUND OF THE INVENTION

1. Technical Field

The present invention relates to an identification recognition device, and more particularly, to an identification recognition device that can detect heart pulses and fingerprint features.

2. Description of the Prior Art

As more and more functions are embedded within personal electronic devices, the personal electronic devices also store more and more private information, such as photos, contacts, records of conversations with others and so on. Therefore, how to prevent people other than the owner from accessing the information stored in the personal electronic device in a quick and efficient way has become an important topic when designing personal electronic devices. Since the recognition procedure is fast and no password memorizing is required, fingerprint identification has become one of the common and popular ways.

Many of the prior arts read the fingerprints of users by optics sensing and compare the fingerprints with the authorized fingerprint file stored in advance. Since the fingerprints are unique, it can help to prevent people other than the owner from reading or using the private information stored in the personal electronic device by fingerprint identification. However, if people use coating or other ways to obtain the owner's fingerprint intentionally, people other than the owner may still pass the fingerprint identification and access the private information. Since the fingerprint identification can only compare the features of the fingerprint images, it is difficult to prevent people from breaking through the fingerprint identification intentionally by using objects with the owner's fingerprints.

For the prior art, an extra life signs sensing device is required when trying to enhance the protection of private information by further confirming if the objects are human or not. However, this approach will increase the manufacturing cost of the personal electronic device and will also require extra space in the personal electronic device.

SUMMARY

One embodiment of the present invention discloses an identification recognition device. The identification recognition device comprises a light emission module, a light sensing module, a pulse scanning unit, a fingerprint scanning unit, and a controller. The light emission module is configured to emit a first incident light and a second incident light to an object. The light sensing module comprises a plurality of light sensing elements and is configured to generate first light currents according to first reflecting light reflected from the object and second light currents according to second reflecting light reflected from the object. The pulse scanning unit is coupled to the light sensing module and is configured to generate current change data of the object according to the first light currents. The fingerprint scanning unit is coupled to the light sensing module and is configured to generate a fingerprint feature of the object according to the second light currents. The controller is coupled to the light emission module, the pulse scanning unit and the fingerprint scanning unit, and the controller is configured to control the light emission module to emit the first incident light, control the light emission module to emit the second incident light when the current change data is consistent with a heart pulse pattern, and determine if the object is able to pass an identification recognition test according to the fingerprint feature of the object. Wherein each of the plurality of light sensing elements senses the first reflecting light and the second reflecting light at different times.

Another embodiment of the present invention discloses a method of operating an identification recognition device. The identification recognition device comprises alight emission module, alight sensing module, a pulse scanning unit, and a fingerprint scanning unit, the light sensing module comprising a plurality of light sensing elements and the method comprises emitting, by the light emission module, a first incident light to an object, generating, by the light sensing module, a plurality of first light currents according to first reflecting light reflected from the object, generating, by the pulse scanning unit, current change data of the object according to the first light currents received by the pulse scanning unit, and when the current change data of the object is consistent with a heart pulse pattern: emitting, by the light emission module, a second incident light to the object, generating, by the light sensing module, a plurality of second light currents according to a second reflecting light reflected from the object, generating, by the fingerprint scanning unit, a fingerprint feature of the object according to the second light currents received by the fingerprint scanning unit, and determining if the object is able to pass an identification recognition test according to the fingerprint feature of the object. Wherein each of the plurality of light sensing elements senses the first reflecting light and the second reflecting light at different times.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
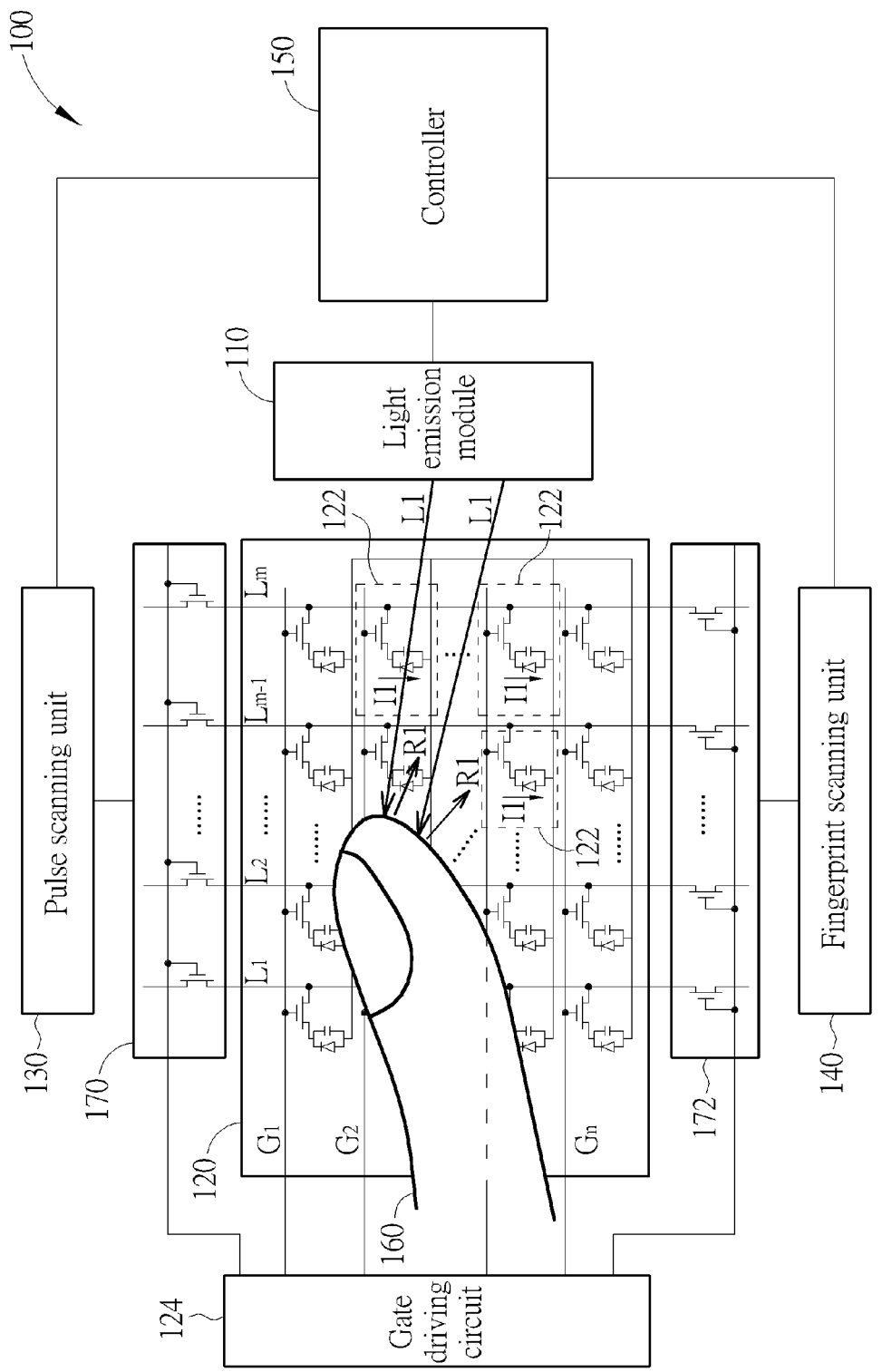
FIG. 1 shows an operation of an identification recognition device according to one embodiment of the present invention.
Figure 2:
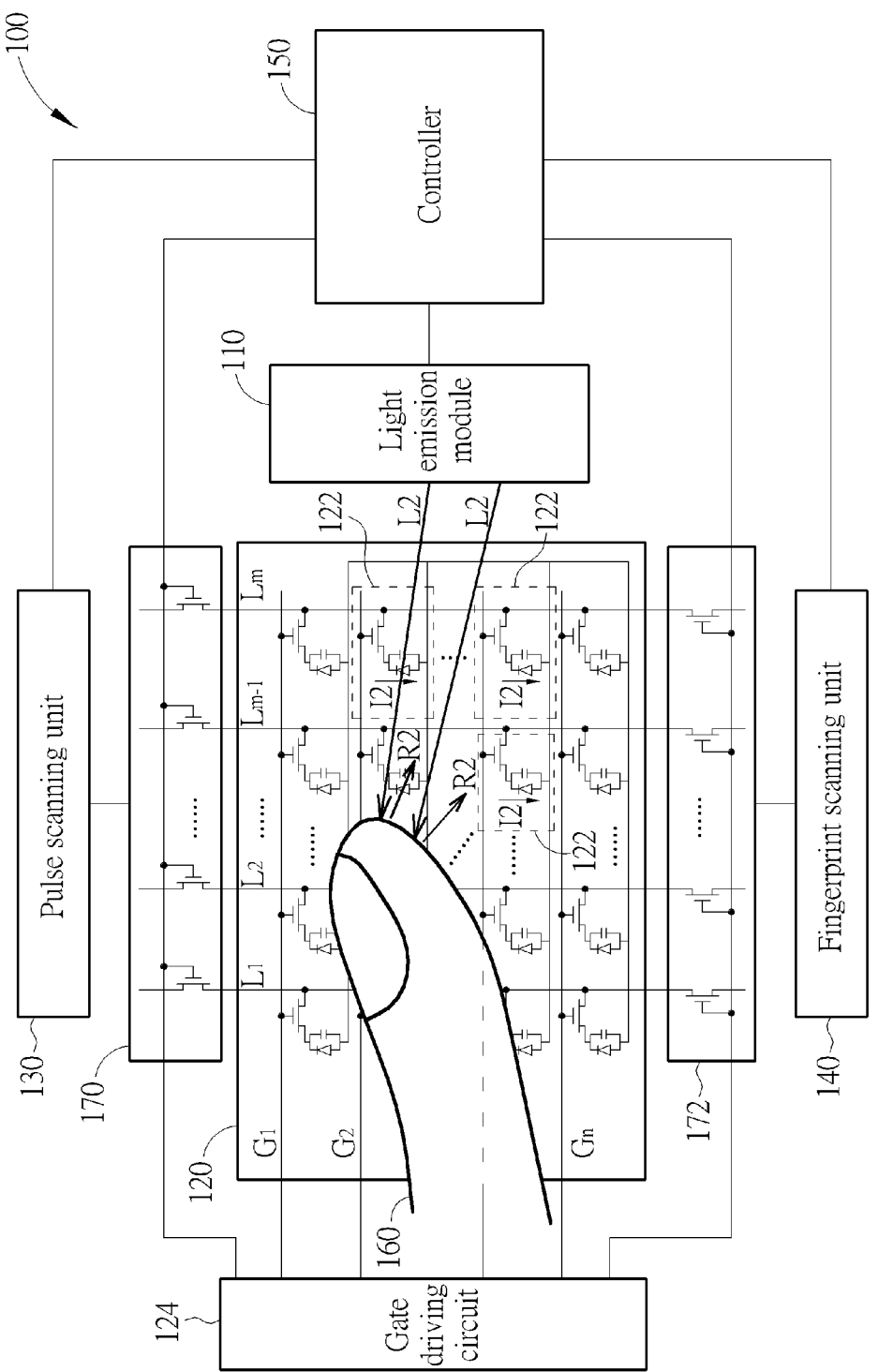
FIG. 2 shows another operation of the identification recognition device of FIG. 1.

FIGS. 1 and 2 show different operations of an identification recognition device 100 according to one embodiment of the present invention. The identification recognition device 100 includes a light emission module 110, a light sensing module 120, a pulse scanning unit 130, a fingerprint scanning unit 140, and a controller 150. In FIGS. 1 and 2, the light emission module 110 can emit a first incident light L1 and a second incident light L2 to the object 160. The light sensing module 120 includes a plurality of light sensing elements 122 and is used to generate a plurality of first light currents I1 according to the first reflecting light R1 reflected from the object 160 and generate a plurality of second light currents I2 according to the second reflecting light R2 reflected from the object 160. Each of the plurality of light sensing elements 122 senses the first reflection light R1 and the second reflection light R2 at different times. According to the embodiment shown in FIG. 1, the light sensing module 120 further includes a plurality of gate lines $G_n$, a plurality of read lines $L_m$, and a gate driving circuit 124, where m and n are positive integers. Each of the plurality of gate lines $G_n$ is coupled to the $n^{th}$ row of light sensing elements 122 of the plurality of light sensing elements 122 and each of the plurality of read lines $L_m$ is coupled to the $m^{th}$ column of light sensing elements 122 of the plurality light sensing elements 122. Each of the plurality of gate lines $G_n$ and each of the plurality of read lines $L_m$ crisscross each other. When the gate line $G_n$ coupled the light sensing element 122 is turned on, the turned on read line $L_m$ can be used to read out light currents generated by the corresponding light sensing element 122. Consequently, when the gate driving circuit 124 turns on the plurality of gate lines $G_n$ in turns, the read lines $L_m$ can read out the light currents generated by the $m^{th}$ column of light sensing elements 122 coupled to the gate line $G_n$ sequentially. The pulse scanning module 130 is coupled to the light sensing module 120 and is used to receive the first light currents I1 and generate current change data of the object 160 according to the first light currents I1. The fingerprint scanning unit 140 is coupled to the light sensing module 120 and is configured to receive the second light currents I2 and generate a fingerprint feature of the object 160 according to the second light currents I2. The controller 150 is coupled to the light emission module 110, the pulse scanning unit 130 and the fingerprint scanning unit 140. The controller 150 is used to control the light emission module 110 to emit the first incident light L1, control the light emission module 110 to emit the second incident light L2 when the current change data of the object 160 is consistent with a heart pulse pattern, and determine if the object 160 is able to pass an identification recognition test according to the fingerprint feature of the object 160.

In addition, to avoid the light currents flowing into both the pulse scanning module 130 and the fingerprint scanning module 140 at the same time, which may cause the circuit to be unstable, the identification recognition device 100 can further include a first set of switches 170 and a second set of switches 172. The first set of switches 170 is coupled between the pulse scanning unit 130 and the plurality of read lines $L_m$, and is used to control an electrical connection between the plurality of read lines $L_m$ and the pulse scanning unit 130. The second set of switches 172 is coupled between the fingerprint scanning unit 140 and the plurality of read lines $L_m$, and is configured to control an electrical connection between the plurality of read lines $L_m$ and the fingerprint scanning unit 140.

In one embodiment of the present invention, the light sensing elements 122 of the light sensing module 120, the plurality of gate lines $G_n$, the plurality of read lines $L_m$, the gate driving circuit 124, the first set of switches 170 and the second set of switches 172 can all be manufactured on a transparent board by the thin-film transistor (TFT) process. The light emission module 110 can be disposed below the light sensing module 120 and stacked with the light sensing module 120. The first incident light L1 and the second incident light L2 emitted by the light emission module 110 can pass through the light sensing module 120 and reach the object 160. The space required by the identification recognition device 100 can thus be reduced.

In FIG. 1, the controller 150 can control the light emission module 110 to emit the first incident light L1 to the object 160. If the object 160 is a finger of the owner, the transparency of the object will be varied with the blood flow due to the pulse of the owner. For example, when the blood is driven out of the heart, the amount of blood in the blood vessel is increased and the transparency is reduced; when the blood is refilled into the heart, the amount of blood in the blood vessel is reduced and the transparency is increased. Consequently, the plurality of first light currents I1 generated by the plurality of light sensing elements 122 according to the first reflection light R1, which is the reflection light of the incident light L1 reflected from the object 160, will also change. At this time, the first set of switches 170 can be turned on and the second set of switches 172 can be turned off so that the pulse scanning unit 130 can generate the current change data of the object 160 according to the change of the plurality of first light currents I1. The controller 150 can determine if the current change data is consistent with the heart pulse pattern. Namely, by comparing the frequency and amplitude changes of the first light currents I1 shown in current change data with the frequency and amplitude changes of heart pulses, the controller 150 can determine if the current change data is consistent with the heart pulse pattern. In one embodiment of the present invention, the identification recognition device 100 can use the gate driving circuit 124 to turn on and turn off the first set of switches 170 and the second set of switches 172. However, this is not to limit the present invention, in other embodiments of the present invention, the identification recognition device 100 can also use the controller 150 to turn on and turn off the first set of switches 170 and the second set of switches 172.

If the current change data is consistent with the heart pulse pattern, the controller 150 can control the light emission device 110 to emit the second incident light L2 to specify the fingerprint feature of the object 160 as shown in FIG. 2. The gate driving circuit 124 can turn on the plurality of gate lines $G_n$ and read lines $L_m$ in turns and read out the second light currents I2 generated by each of the light sensing elements 122 according to the second reflection light R2, which is the reflection light of the second incident light L2 reflected from the object 160. Each of the plurality of light sensing elements 122 may sense a second reflection light R2 with different strength due to the texture on the surface of the object 160 and, thus, may generate the second light current I2 with a different amount accordingly. At this time, the second set of switches 172 can be turned on and the first set of switches 170 can be turned off so that the fingerprint scanning unit 140 can generate the fingerprint feature of the object 160 according to the second light currents I2 with different amounts. The controller 150 can thus determine if the object 160 is able to pass an identification recognition test by judging if the fingerprint feature of the object 160 is consistent with the fingerprint of the owner. In one embodiment of the present invention, the fingerprint feature of the object 160 includes the distribution of the texture and the depth of the texture on the surface of the object 160. The controller 150 can compare the fingerprint feature of the object 160 with the fingerprint information of the owner stored in advance. If the two have the same feature, then the object 160 should be the finger of the owner and the object 160 passes the identification recognition test.

Furthermore, since the blood is red, the first incident light L1 can be infrared light so the recognition accuracy of the pulse can be increased. Also, the strength of the first incident light L1 should be strong enough to penetrate through the surface of the object 160 to detect the transparency change of the blood vessel inside. To show the texture on the surface of the object 160 clearly, the second incident light L2 can also be infrared light and the strength of the second incident light L2 is preferred to not be too strong for avoiding failing to detect the details of the texture. In one embodiment of the present invention, the strength of the first incident light L1 is substantially greater than the strength of the second incident light L2. In addition, since the transparency of the object 160 is related to the pulse of the object 160, the transparency of each parts of the object 160 is similar to each other, and, thus, the first set of switches 170 can turn on the electrical connection between the M of the m read lines $L_m$ and the pulse scanning unit 130 at the same time so the pulse scanning unit 130 can receive changes of the first light currents I1 and doesn't need to scan each read lines one by one, where M is a positive integer that is smaller or equal to m. Consequently, the change of the light currents received by the pulse scanning unit 130 can be increased, which can help to increase the detection accuracy, to reduce the gain of the backend amplifier and to reduce the noises due to the reduction of the gain.

According to the aforesaid embodiments of the present invention, the personal electronic device can use the same light sensing module to detect both the pulse information and the fingerprint feature of the object to recognize the identification of the user according to the pulse information and the fingerprint feature and to further enhance the protection to the personal electronic device without extra circuits for sensing heart pulses. The design of the personal electronic devices can also be simplified.

Figure 3:
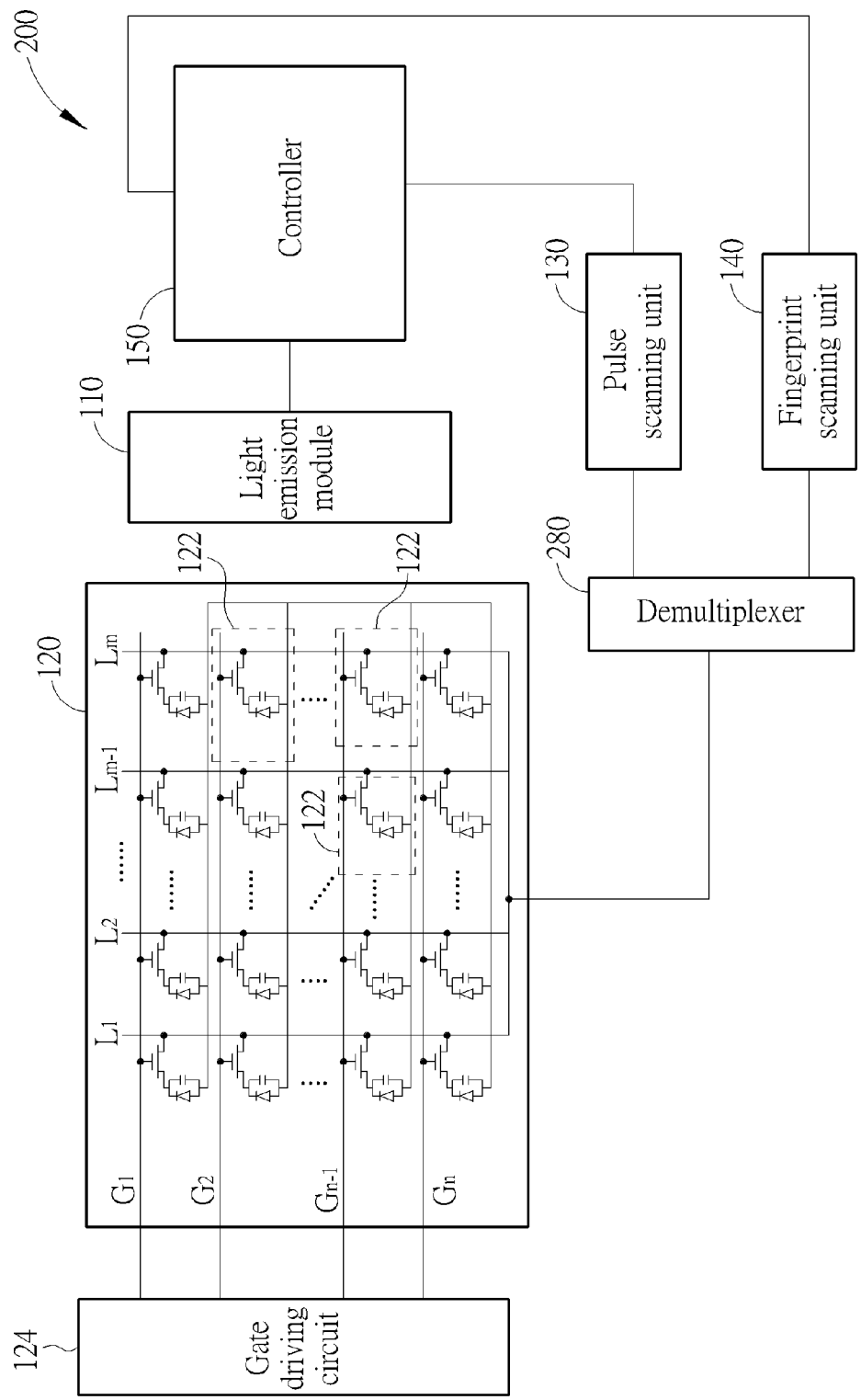
FIG. 3 shows an identification recognition device according to another embodiment of the present invention.

FIG. 3 shows an identification recognition device 200 according to another embodiment of the preset invention. The identification recognition device 200 and the identification recognition device 100 have similar structures, and the difference between these two is that the identification recognition device 200 can use the demultiplexer 280 to replace the functions of the first set of switches 170 and the second set of switches 172 in the identification recognition device 100. The demultiplexer 280 is coupled to the plurality of read lines $L_m$, the pulse scanning unit 130 and the fingerprint scanning unit 140 and is used to control the electrical connection between the pulse scanning unit 130 and the plurality of read lines $L_m$ and the electrical connection between the fingerprint scanning unit 140 and the plurality of read lines $L_m$ so as to make the pulse scanning unit 130 receive the first light currents I1 and to make the fingerprint scanning unit 140 receive the second light currents I2 at different times. Therefore, the pulse scanning unit 130 and the fingerprint scanning unit 140 of the identification recognition device 200 can be disposed in the same side of the light sensing module 120, which helps to extend the design flexibility of the identification recognition device 200. In one embodiment of the present invention, the identification recognition device 200 can use the controller 150 to control the demultiplexer 280.

Figure 4:
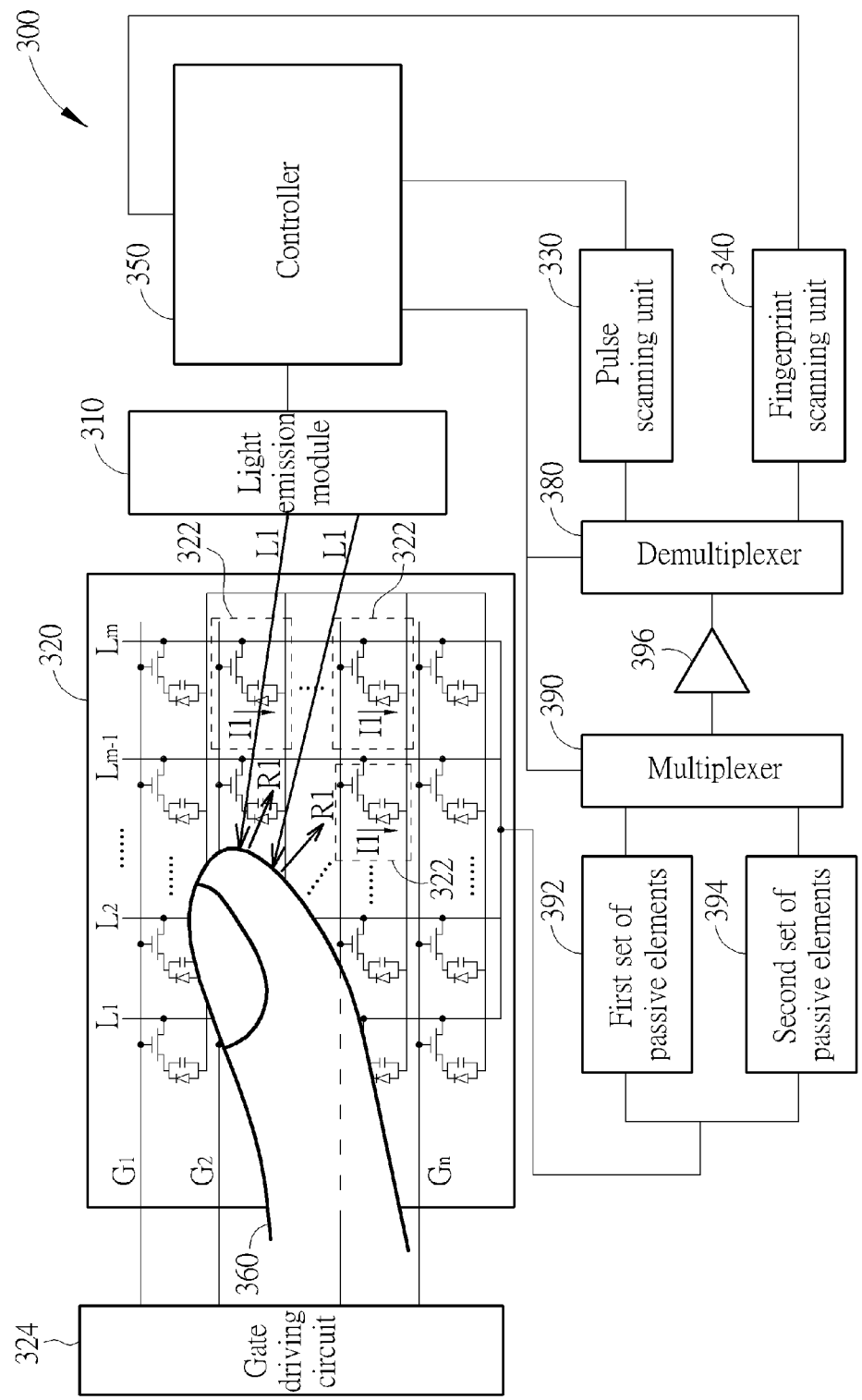
FIG. 4 shows an operation of an identification recognition device according to another embodiment of the present invention.
Figure 5:
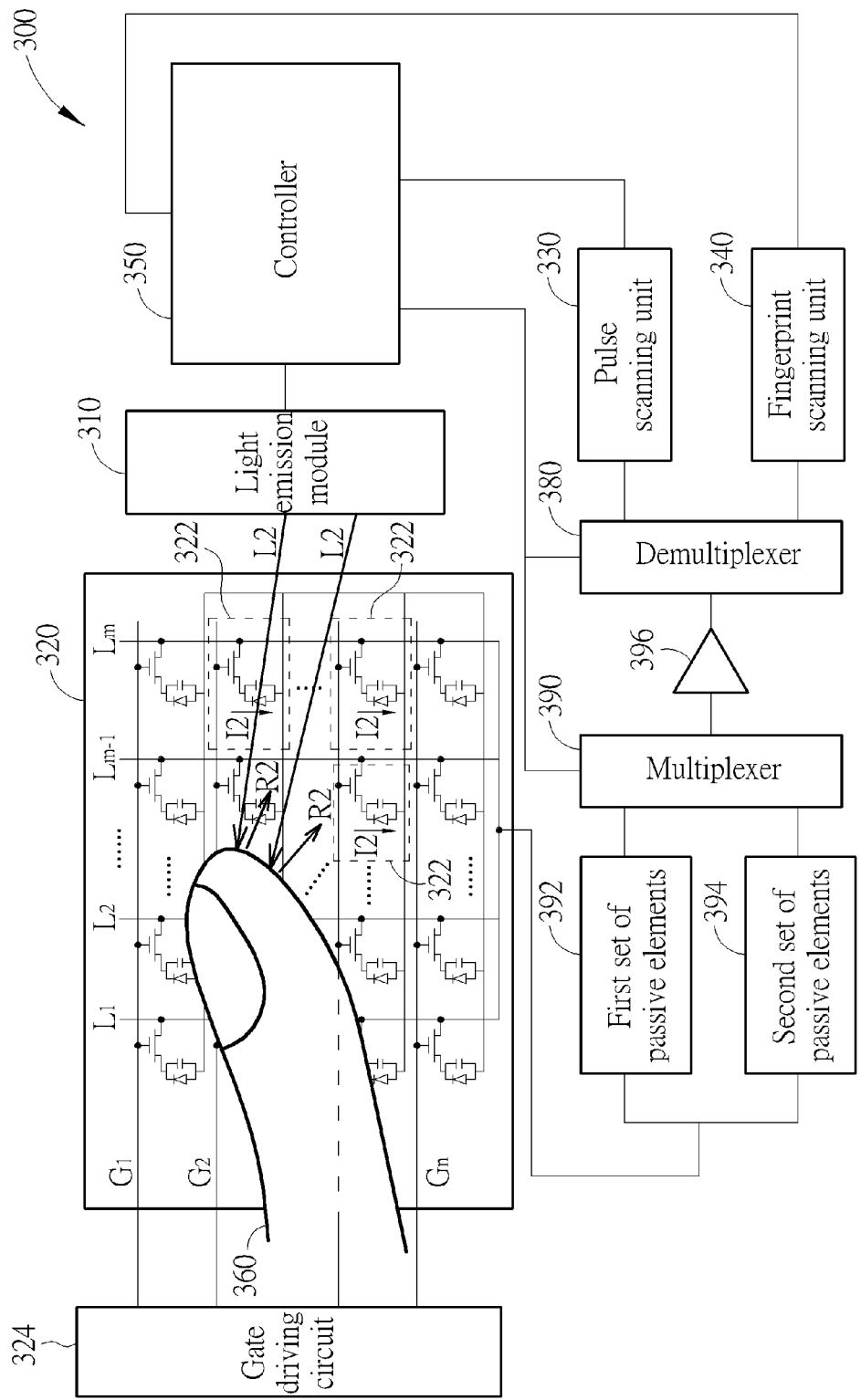
FIG. 5 shows another operation of the identification recognition device of FIG. 4.

FIGS. 4 and 5 show different operations of an identification recognition device 300 according to another embodiment of the present invention. The identification recognition device 300 includes a light emission module 310, a light sensing module 320, a pulse scanning unit 330, a fingerprint scanning unit 340, a controller 350, a demultiplexer 380, a multiplexer 390, a first set of passive elements 392, a second set of passive elements 394, and an amplifier 396. In FIGS. 4 and 5, the light emission module 310 can emit the first incident light L1 and the second incident light L2 to the object 360. The light sensing module 320 includes a plurality of light sensing elements 322, a plurality of gate lines $G_n$, a plurality of read lines $L_m$, and a gate driving circuit 324, where n and m are positive integers. Each of the gate lines $G_n$ is coupled to the $n^{th}$ row of light sensing elements 322 of the plurality of light sensing elements 322, and each of the read lines $L_m$ is coupled to the $m^{th}$ column of light sensing elements 322 of the plurality of light sensing elements 322. Each of the plurality of gate lines $G_n$ and each of the plurality of read lines $L_m$ crisscross each other. When the gate driving circuit 324 turns on the plurality of gate lines $G_n$ in turns, the read lines $L_m$ can read out the light currents generated by the $m^{th}$ column of light sensing elements 322 coupled to the gate line $G_n$ sequentially. The first set of passive elements 392 is coupled to the multiplexer 390 and the plurality of read lines $L_m$. The second set of passive elements 394 is coupled to the multiplexer 390 and the plurality of read lines $L_m$. The amplifier 396 is coupled to the demultiplexer 380 and the multiplexer 390.

In FIG. 4, the controller 350 controls the light emission module 310 to emit the first incident light L1 to the object 360. If the object 360 is a finger of the user, the transparency of object 360 varies with the blood flow of the user. The plurality of light sensing elements 322 can generate a plurality of first light current I1 according to the first reflection light R1 reflected from the object 360. Since the first light currents I1 may include noises coming from the environment, the controller 350 can control the multiplexer 390 to turn on the electrical connection between the first set of passive elements 392 and the amplifier 396 so that the amplifier 396 can use the first set of passive elements 392 to amplify currents of the first light currents I1 within a specific frequency and to reduce the impact to the identification recognition device 300 caused by the noise. Also, the controller 350 can control the demultiplexer 380 so that the pulse scanning unit 330 can receive the currents of the first light currents I1 within the specific frequency band and to generate the current change data of the object 360. Thus, the controller 350 can determine if the current change data is consistent with the heart pulse pattern.

If the controller 350 determines that the object 360 has pulses, the controller 350 can control the light emission module 310 to emit the second incident light L2 to specify the fingerprint features of the object 360 as shown in FIG. 5. The light sensing module 320 can turn on the plurality of gate lines $G_n$ and read lines $L_m$ in turns to read the second light currents I2 generated by the light sensing elements 322 according to the second reflection light R2 reflected from the object 360. Since the strength of the second light currents I2 may be weaker and the texture feature detected will not change with time, the controller 350 can control the multiplexer 390 to turn on the electrical connection between the second set of passive elements 394 and the amplifier 396 so that the amplifier 396 can generate the integral value of the second light currents I2. Also, the controller can control the demultiplexer 380 to make the fingerprint scanning unit 340 receive the integral value of the second light currents I2 generated by the amplifier 396 and generate the fingerprint feature of the object 360 so that the impact to the identification recognition device 300 caused by noises can be reduced and the different amounts of the second light currents I2 caused by the different depths of the texture on the surface of the object 360 can be emphasized. The controller 350 can determine if the object 360 passes the identification recognition test according to the fingerprint feature of the object 360.

According to the aforesaid embodiments, by using the demultiplexer 380 and the multiplexer 390 to control the electrical connections between the amplifier 396 and the first set of passive elements 392, the second set of passive elements 394, the pulse scanning unit 330 and the fingerprint scanning unit 340, the amplifier 396 can be used at different times for functioning as a filtering amplifier or an integrator, making the pulse scanning unit 330 receive the currents of plurality of the first light currents I1 with the specific frequency band to generate the current change date of the object 360, and making the fingerprint scanning unit 340 receive the integral value of the plurality of second light currents I2 to generate the fingerprint feature of the object 360. Consequently, the number of the hardware components required by the identification recognition device 300 can be reduced and the design flexibility can be extended.

In the aforesaid embodiments, the light sensing module 120 and 320 can both be manufactured on a transparent board with the low temperature poly-silicon (LTPS) process. The passive elements 392 and 394, the multiplexer 390 and the amplifier 396 can also be manufactured on the same transparent board as the light sensing module 320 disposed with the LTPS process so that the design of the identification recognition device 300 can be simplified and the space required by the identification recognition device 300 can be reduced.

According to the embodiments of the present invention, the personal electronic device can use the same light sensing module to detect both the pulse information and fingerprint feature of an object and specify the identification of the user according to the pulse information and the fingerprint feature so as to enhance the protection to the personal electronic device without adding extra circuits to detect the pulse and simplify the design of the personal electronic device.

Figure 6:
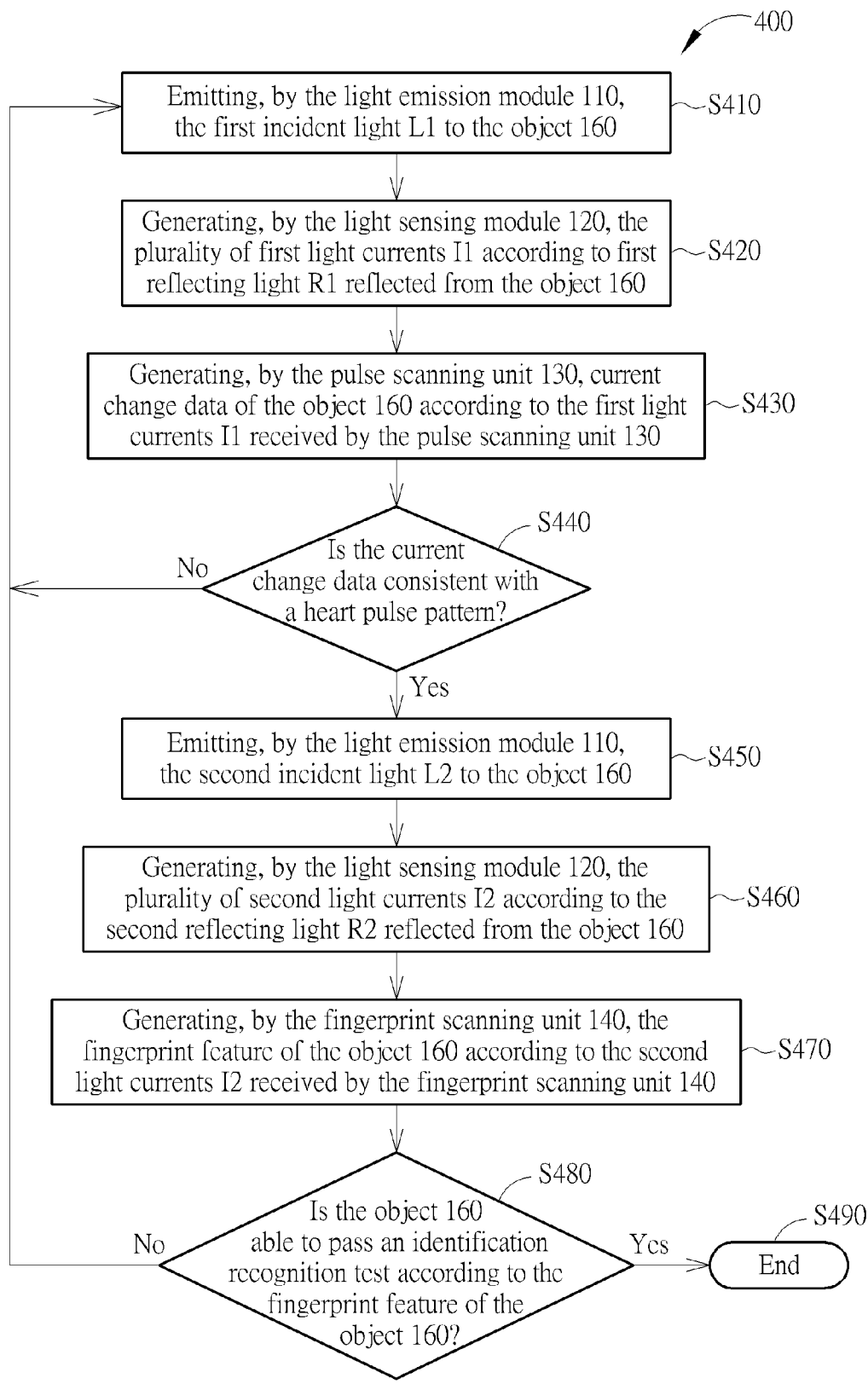
FIG. 6 shows an operation flow of the identification recognition device of FIG. 1.

FIG. 6 shows the flow chart of the method 400 for operating the identification recognition device 100 according to one embodiment of the present invention. The method 400 includes the following steps:

S410: emitting, by the light emission module 110, the first incident light L1 to the object 160;

S420: generating, by the light sensing module 120, the plurality of first light currents I1 according to first reflecting light R1 reflected from the object 160;

S430: generating, by the pulse scanning unit 130, current change data of the object 160 according to the first light currents I1 received by the pulse scanning unit 130;

S440: If the current change data is consistent with a heart pulse pattern, going to step S450, otherwise going back to step S410;

S450: emitting, by the light emission module 110, the second incident light L2 to the object 160;

S460: generating, by the light sensing module 120, the plurality of second light currents I2 according to the second reflecting light R2 reflected from the object 160;

S470: generating, by the fingerprint scanning unit 140, the fingerprint feature of the object 160 according to the second light currents I2 received by the fingerprint scanning unit 140;

S480: determining if the object 160 is able to pass an identification recognition test according to the fingerprint feature of the object 160. If yes, going to step S490; otherwise, going back to step S410;

S490: end.

Wherein, each of the plurality of light sensing elements 122 senses the first reflecting light R1 and the second reflecting light R2 at different times. Also, according to one embodiment of the present invention, the first incident light L1 can be infrared light.

According to the aforesaid method of the present invention, the same light sensing module can be used to both detect the pulse information and fingerprint feature of an object and the identification of the user can be specified according to the pulse information and the fingerprint feature so that protection of the personal electronic device can be enhanced without adding extra circuits to detect the pulse, and the design of the personal electronic device can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An identification recognition device comprising:
 a light emission module configured to emit a first incident light and a second incident light to an object;
 a light sensing module comprising a plurality of light sensing elements and configured to generate first light currents according to first reflecting light reflected from the object and second light currents according to second reflecting light reflected from the object;
 a pulse scanning unit coupled to the light sensing module and configured to generate current change data of the object according to the first light currents;
 a fingerprint scanning unit coupled to the light sensing module and configured to generate a fingerprint feature of the object according to the second light currents; and
 a controller coupled to the light emission module, the pulse scanning unit and the fingerprint scanning unit, and configured to control the light emission module to emit the first incident light, control the light emission module to emit the second incident light when the current change data is consistent with a heart pulse pattern, and determine if the object is able to pass an identification recognition test according to the fingerprint feature of the object;
 wherein each of the plurality of light sensing elements senses the first reflecting light and the second reflecting light at different times.

2. The identification recognition device of claim 1, wherein the first incident light or the second incident light is infrared light, and an intensity of the first incident light is substantially greater than an intensity of the second incident light.

3. The identification recognition device of claim 1, wherein the light sensing module further comprises:
 a plurality of gate lines, wherein each of the plurality of gate lines is coupled to a row of light sensing elements of the plurality of light sensing elements;
 a plurality of read lines, wherein each of the plurality of read lines is coupled to a column of light sensing elements of the plurality light sensing elements to read out light currents generated by the column of light sensing elements; and
 a gate driving circuit coupled to the plurality of gate lines and configured to turn on the plurality of gate lines sequentially;
 wherein each of the plurality of gate lines and each of the plurality of read lines crisscross each other.

4. The identification recognition device of claim 3, further comprising:
 a first set of switches coupled between the pulse scanning unit and the plurality of read lines, and configured to control an electrical connection between the plurality of read lines and the pulse scanning unit; and a second set of switches coupled between the fingerprint scanning unit and the plurality of read lines, and configured to control an electrical connection between the plurality of read lines and the fingerprint scanning unit;

wherein:

when the first set of switches are turned on, the pulse scanning module receives the first light currents;

when the second set of switches are turned on, the fingerprint scanning module receives the second light currents; and the first set of switches and the second switches are turned on in different periods of time.

5. The identification recognition device of claim 4, wherein each switch of the first set of switches is configured to control an electrical connection between the pulse scanning unit and M read lines, wherein M is a positive integer.

6. The identification recognition device of claim 3, further comprising:

a demultiplexer coupled to the plurality of read lines, the pulse scanning unit and the fingerprint scanning unit, and configured to control an electrical connection between the pulse scanning unit and the plurality of read lines and an electrical connection between the fingerprint scanning unit and the plurality of read lines so as to make the pulse scanning unit receive the first light currents and to make the fingerprint scanning unit receive the second light currents.

7. The identification recognition device of claim 6, wherein the light sensing module is formed by performing a low temperature poly-silicon (LTPS) process.

8. The identification recognition device of claim 7, further comprising:

a multiplexer;

a first set of passive elements coupled to the multiplexer and the plurality of read lines;

a second set of passive elements coupled to the multiplexer and the plurality of read lines;

an amplifier coupled to the demultiplexer and the multiplexer, and controlled by the multiplexer and the demultiplexer to:

amplify currents of the first light currents within a specific frequency band when electrically connected to the first set of passive elements, to make the pulse scanning unit receive the currents of the first light currents within the specific frequency band and generate the current change data of the object according to the currents of the first light currents within the specific frequency band; and generate an integral value of the second light currents when electrically connected to the second set of passive elements, to make the fingerprint scanning unit receive the integral value of the second light currents and generate the fingerprint feature of the object according to the integral value of the second light currents.

9. A method of operating an identification recognition device, the identification recognition device comprising a light emission module, a light sensing module, a pulse scanning unit, and a fingerprint scanning unit, the light sensing module comprising a plurality of light sensing elements, the method comprising:

emitting, by the light emission module, a first incident light to an object;

generating, by the light sensing module, a plurality of first light currents according to first reflecting light reflected from the object;

generating, by the pulse scanning unit, current change data of the object according to the first light currents received by the pulse scanning unit; and when the current change data of the object is consistent with a heart pulse pattern:

emitting, by the light emission module, a second incident light to the object;

generating, by the light sensing module, a plurality of second light currents according to a second reflecting light reflected from the object;

generating, by the fingerprint scanning unit, a fingerprint feature of the object according to the second light currents received by the fingerprint scanning unit; and determining if the object is able to pass an identification recognition test according to the fingerprint feature of the object;

wherein each of the plurality of light sensing elements senses the first reflecting light and the second reflecting light at different times.

10. The method of claim 9, wherein the first incident light is infrared light.

11. The method of claim 9, wherein the second incident light is infrared light.

12. The method of claim 9, wherein an intensity of the first incident light is substantially greater than an intensity of the second incident light.

* * * * *